(12) United States Patent
Janarthanam et al.

(10) Patent No.: US 7,328,339 B1
(45) Date of Patent: Feb. 5, 2008

(54) METHOD OF TESTING THE ENCRYPTION FUNCTION OF A DEVICE

(75) Inventors: Sajosh Janarthanam, Austin, TX (US); Kheng Guan (Nigel) Tan, Singapore (SG)

(73) Assignee: Advanced Micro Devices Inc, Sunnyvale, CA (US)

( * ) Notice: Subject to any disclaimer, the term of this patent is extended or adjusted under 35 U.S.C. 154(b) by 780 days.

(21) Appl. No.: 10/699,947

(22) Filed: Nov. 3, 2003

(51) Int. Cl.
*H04L 9/00* (2006.01)
(52) U.S. Cl. .................. 713/161; 713/168; 713/181; 380/37
(58) Field of Classification Search .............. 380/37; 713/161, 181, 168
See application file for complete search history.

(56) References Cited

U.S. PATENT DOCUMENTS

| | | | | |
|---|---|---|---|---|
| 5,917,909 A * | 6/1999 | Lamla | ................. | 705/67 |
| 6,421,799 B1 * | 7/2002 | Ferrant | ................. | 714/718 |
| 7,143,295 B1 * | 11/2006 | Trimberger | ................. | 713/189 |
| 2003/0206627 A1 * | 11/2003 | Penugonda et al. | ............ | 380/2 |

* cited by examiner

*Primary Examiner*—Gilberto Barron, Jr.
*Assistant Examiner*—Samson Lemma

(57) ABSTRACT

A packet data string is provided to a device under test (DUT), which preprocesses the packet data string, based on static inputs, to provide packet segment data strings, which are placed in a queue in a memory structure. Separate therefrom, a packet segment data string is applied to an encryption engine of the DUT, which encryption engine has an initialization vector applied thereto, and an encryption algorithm of the encryption engine is applied to this packet segment data string to provide an encrypted packet segment data string. Bit length and initialization vector matching techniques are used to eliminate packet segment data strings in the queue from further consideration, and after bit length and initialization vector matching are achieved in regard to a packet segment data string in the queue, such packet segment data string is encrypted using the encryption algorithm and an initialization vector extracted from the previously encrypted packet segment data string, whereupon a bitwise comparison is made between the encrypted packet segment data strings.

5 Claims, 17 Drawing Sheets

METHOD OF TESTING THE ENCRYPTION FUNCTION OF A DEVICE

BACKGROUND OF THE INVENTION

1. Technical Field

This invention relates generally to encryption of data, and more particularly, to the testing of an encryption function of a device under test.

2. Background Art

FIGS. 1-7 illustrate the operation of a device under test (DUT) which uses cipher block chaining for the encryption of a packet of data P1 in the form of a data string. The encrypted data issuing from the DUT is a function of (i) properties of the data packet (for example packet length), DUT settings, and security association (SA) properties, all of which are set and fixed (static) prior to operation of the DUT, and (ii) dynamic variables, i.e., initialization vectors, as will now be described.

Since the length of the packet data string P1 may be quite long, the DUT includes a segmentation function for breaking down the packet into a series of packet segment data strings, shown at P1S1, P1S2, P1S3, P1S4, so that packet segment size or length is less than the maximum packet size supported by the network.

The DUT in this example includes four encryption engines, noted at E0, E1, E2, E3. Each encryption engine includes an encryption algorithm, with each encryption engine E0, E1 including the encryption algorithm AES, while each encryption engine E2, E3 includes the encryption algorithm DES. The original packet data string P1 is associated with a security association (SA) property which indicates and determines the algorithm to be applied thereto (in the present example encryption algorithm AES), which indication is passed on and associated with each packet segment data string P1S1, P1S2, P1S3, P1S4.

Initially, each encryption engine has applied thereto a chosen and known initialization vector or key, for example, encryption engine E0 has applied to thereto initialization vector IVAES0, encryption engine E1 has applied thereto initialization vector IVAES1, encryption engine E2 has applied thereto initialization vector IVDES0, and encryption engine E3 has applied thereto initialization vector IVDES1.

A packet segment data string, for example, packet segment data string P1S1, is applied to a cross-switch (CSW) of the DUT (although the packet segment data string is indicated as the first data string to be applied to the CSW, the packet segment data strings can be applied in any order). As indicated above, this packet segment data string P1S1 is associated with SA property indicating the encryption algorithm to be applied to that data string. An input signal IS is applied to the CSW, which input signal IS is a function of the SA property indicating the encryption algorithm to be applied. For example, if the SA property indicates that algorithm AES is to be applied to a packet segment data string, the CSW will receive the data string and apply it to either encryption engine E0 or encryption engine E1, both of which include the encryption algorithm AES. The decision whether to select encryption engine E0 or encryption engine E1 depends on which such encryption engine is free for operation (if both encryption engines E0, E1 are free, the system is preset to select one of them—if both encryption engines E0, E1 are in use, the encryption engine which becomes free first is selected).

In the example shown in FIG. 1, the packet segment data string P1S1 is applied to the encryption engine E1, which has initialization vector IVAES1 applied thereto. Encrypted packet segment data string eP1S1, based on the encryption algorithm AES of the encryption engine E1, issues from the DUT, and has included therewith the initialization vector applied to the encryption engine E1, i.e., initialization vector IVAES1.

In a cipher block chaining system such as the present one, the application of an encryption algorithm of an encryption engine to a data string causes the initialization vector applied to that encryption engine to change to another value. Thus, as indicated in FIG. 2, encryption engine E0 has applied to thereto initialization vector IVAES0, and encryption engine E1 has applied thereto (new) initialization vector IVAES2 (encryption engines E2 and E3, which include encryption algorithm DES not used in the present example, are removed from the drawings for clarity).

Another packet segment data string, for example packet segment data string P1S2, is applied to the CSW. This data string P1S2 also is associated with SA property indicating that the encryption algorithm AES is to be applied thereto, as described above. Again, the CSW will receive the data string and apply it to either encryption engine E0 or E1 (both of which include the encryption algorithm AES), with the selection of encryption engine E0 or E1 based on the criteria described above.

With reference to FIG. 3, assuming that encryption engine E0 is selected, the packet segment data string P1S2 is applied to encryption engine E0, which has initialization vector IVAES0 applied thereto. The encryption engine E0 applies encryption algorithm AES to the packet segment data string P1S2, so that encrypted packet segment data string eP1S2, based on the encryption algorithm AES of the encryption engine E0, issues from the DUT, and has included therewith the initialization vector applied to the encryption engine E0, i.e., the initialization vector IVAES0.

As described above, the application of an encryption algorithm of encryption engine to a data string causes the initialization vector applied to that encryption engine to change to a new value. Thus, as indicated in FIG. 4, encryption engine E0 now has applied thereto (new) initialization vector IVAES3, and encryption engine E1 has applied thereto initialization vector IVAES2.

Next, another packet segment data string, for example packet segment data string P1S3, is applied to the CSW. This data string P1S3 also is associated with SA property indicating that the encryption algorithm AES is to be applied thereto, as described above. Again, the CSW will receive the data string P1S3 and apply it to either encryption engine E0 or E1 (both of which include the encryption algorithm AES), with the selection of encryption engine E0 or E1 based on the criteria described above.

With reference to FIG. 5, assuming that encryption engine E1 is selected, the packet segment data string P1S3 is applied to encryption engine E1, which has initialization vector IVAES2 applied thereto. The encryption engine E1 applies encryption algorithm AES to the packet segment data string P1S3, so that encrypted packet segment data string eP1S3, based on the encryption algorithm AES of the encryption engine E1, issues from the DUT, and also has include therewith the initialization vector applied to the encryption engine E1, i.e., initialization vector IVAES2.

As described above, the application of an encryption algorithm of encryption engine to a data string causes the initialization vector applied to that encryption engine to change to a new value. Thus, as indicated in FIG. 6, encryption engine E0 has applied thereto initialization vector IVAES3, and encryption engine E1 has applied thereto (new) initialization vector IVAES4.

Next, another packet segment data string, for example packet segment data string P1S4, is applied to the CSW. This data string P1S4 also is associated with SA property indicating that the encryption algorithm AES is to be applied thereto, as described above. Again, the CSW will receive the data string P1S4 and apply it to either encryption engine E0 or E1 (both of which include the encryption algorithm AES), with the selection of encryption engine E0 or E1 based on the criteria described above.

With reference to FIG. 7, assuming that encryption engine E1 is selected, the packet segment data string P1S4 is applied to encryption engine E1, which has initialization vector IVAES4 applied thereto. The encryption engine E1 applies encryption algorithm AES to the packet segment data string P1S4, so that encrypted packet segment data string eP1S4, based on the encryption algorithm AES of the encryption engine E1, issues from the DUT, and also has include therewith the initialization vector applied to the encryption engine E1, i.e., initialization vector IVAES4.

This example illustrates and describes the segmentation of a single packet data string P1, and the encryption of several packet segment data strings P1S1, P1S2, P1S3, P1S4 of that packet using several encryption steps. It will be understood that the actual operation takes place on a large number of packets each of which may well provide a large number of segments for encryption. In a simple example, let us assume a packet data string which is broken down into packet data segment strings P1S1, P1S2, P1S3, P1S4, with these packet data segment strings associated with SA property indicating that encryption algorithm AES is to be applied thereto, and packet segment data strings P1S5, P1S6, P1S7, P1S8, with these packet data segment strings associated with SA property indicating that encryption algorithm DES is to be applied thereto. For the system shown in FIGS. 1-7 and described above, a number of scenarios exist. For example, assuming the packet segment data strings are applied to the DUT in the order P1S1-P1S8, and the packet segment data string P1S1 is applied to the encryption engine E0, the possible scenarios for packet segment data strings P1S1-P1S4 are as follows:

| FIRST POSSIBILITY | | | | |
|---|---|---|---|---|
| SEGMENT | P1S1 | P1S2 | P1S3 | P1S4 |
| ENCRYPTION ENGINE | E0 | E0 | E0 | E0 |
| SECOND POSSIBILITY | | | | |
| SEGMENT | P1S1 | P1S2 | P1S3 | P1S4 |
| ENCRYPTION ENGINE | E0 | E1 | E0 | E0 |
| THIRD POSSIBILITY | | | | |
| SEGMENT | P1S1 | P1S2 | P1S3 | P1S4 |
| ENCRYPTION ENGINE | E0 | E0 | E1 | E0 |
| FOURTH POSSIBILITY | | | | |
| SEGMENT | P1S1 | P1S2 | P1S3 | P1S4 |
| ENCRYPTION ENGINE | E0 | E0 | E0 | E1 |
| FIFTH POSSIBILITY | | | | |
| SEGMENT | P1S1 | P1S2 | P1S3 | P1S4 |
| ENCRYPTION ENGINE | E0 | E1 | E1 | E0 |
| SIXTH POSSIBILITY | | | | |
| SEGMENT | P1S1 | P1S2 | P1S3 | P1S4 |
| ENCRYPTION ENGINE | E0 | E1 | E0 | E1 |
| SEVENTH POSSIBILITY | | | | |
| SEGMENT | P1S1 | P1S2 | P1S3 | P1S4 |
| ENCRYPTION ENGINE | E0 | E0 | E1 | E1 |
| EIGHTH POSSIBILITY | | | | |
| SEGMENT | P1S1 | P1S2 | P1S3 | P1S4 |
| ENCRYPTION ENGINE | E0 | E1 | E1 | E1 |

It will be remembered that it was assumed that the packet segment data string P1S1 was applied to encryption engine E0. The alternative is that the packet segment data string P1S1 was applied to encryption engine E1. Following the above analysis, this results in another eight possible scenarios (thus far total of 16 possibilities).

It will also be remembered that it was assumed that the packet segment data strings are applied to the DUT in the order P1S1-P1S8. However, the packet segment data strings can be applied to the DUT in any order. That is, the (four) packet segment data strings P1S1-P1S4 (to which the encryption algorithm AES is to be applied, i.e., the packet segment data strings P1S1-P1S4 are to be associated with encryption engines E0, E1) can be applied to the DUT in 4! or 4×3×2×1=24 possible orders. Thus, the possible total number of encryption variations for the packet segment data strings P1S1-P1S4 is 16×24=384.

Repeating this approach for packet segment data strings P1S5, P1S6, P1S7, P1S8 (associated with SA property indicating that encryption algorithm DES is to be applied thereto), another 384 possible scenarios are added, resulting in a total of 768 encryption variations.

It will readily be seen that the number of encryption possibilities is very large, even in the relatively simple situation described, i.e., a given packet segment data string to which the encryption algorithm AES is applied can take any one of 384 encrypted forms.

While it would be of course desirable to test the encryption function of the DUT for proper operation thereof, i.e., that the encrypted packet data string is as expected, the matching of resulting encrypted packet data segment against each of the possible encrypted forms is impractical, because of the very large number of possible encrypted forms.

Therefore, what is needed is a method for testing the encryption function of a device, which method is simple and effective in use.

DISCLOSURE OF THE INVENTION

A packet data string is provided to a device under test (DUT), which preprocesses the packet data string, based on static inputs, to provide packet segment data strings, which are placed in a queue in a memory structure. Separate therefrom, a packet segment data string is applied to an encryption engine of the DUT, which encryption engine has an initialization vector applied thereto, and an encryption algorithm of the encryption engine is applied to this packet segment data string to provide an encrypted packet segment data string. Bit length and initialization vector matching techniques are used to eliminate packet segment data strings in the queue from further consideration, and after bit length and initialization vector matching are achieved in regard to a packet segment data string in the queue, such packet segment data string is encrypted using the encryption algorithm and an initialization vector extracted from the previously encrypted packet segment data string, whereupon a bitwise comparison is made between the encrypted packet segment data strings.

The present invention is better understood upon consideration of the detailed description below, in conjunction with the accompanying drawings. As will become readily apparent to those skilled in the art from the following description, there is shown and described an embodiment of this invention simply by way of the illustration of the best mode to carry out the invention. As will be realized, the invention is capable of other embodiments and its several details are capable of modifications and various obvious aspects, all without departing from the scope of the invention. Accordingly, the drawings and detailed description will be regarded as illustrative in nature and not as restrictive.

BRIEF DESCRIPTION OF THE DRAWINGS

The novel features believed characteristic of the invention are set forth in the appended claims. The invention itself, however, as well as said preferred mode of use, and further objects and advantages thereof, will best be understood by reference to the following detailed description of an illustrative embodiment when read in conjunction with the accompanying drawings, wherein:

BEST MODE(S) FOR CARRYING OUT THE INVENTION

Reference is now made in detail to a specific embodiment of the present invention which illustrates the best mode presently contemplated by the inventors for practicing the invention. Such embodiment is illustrated in FIGS. 8-15, and also in the flow diagram of FIG. 16.

Figure 1:
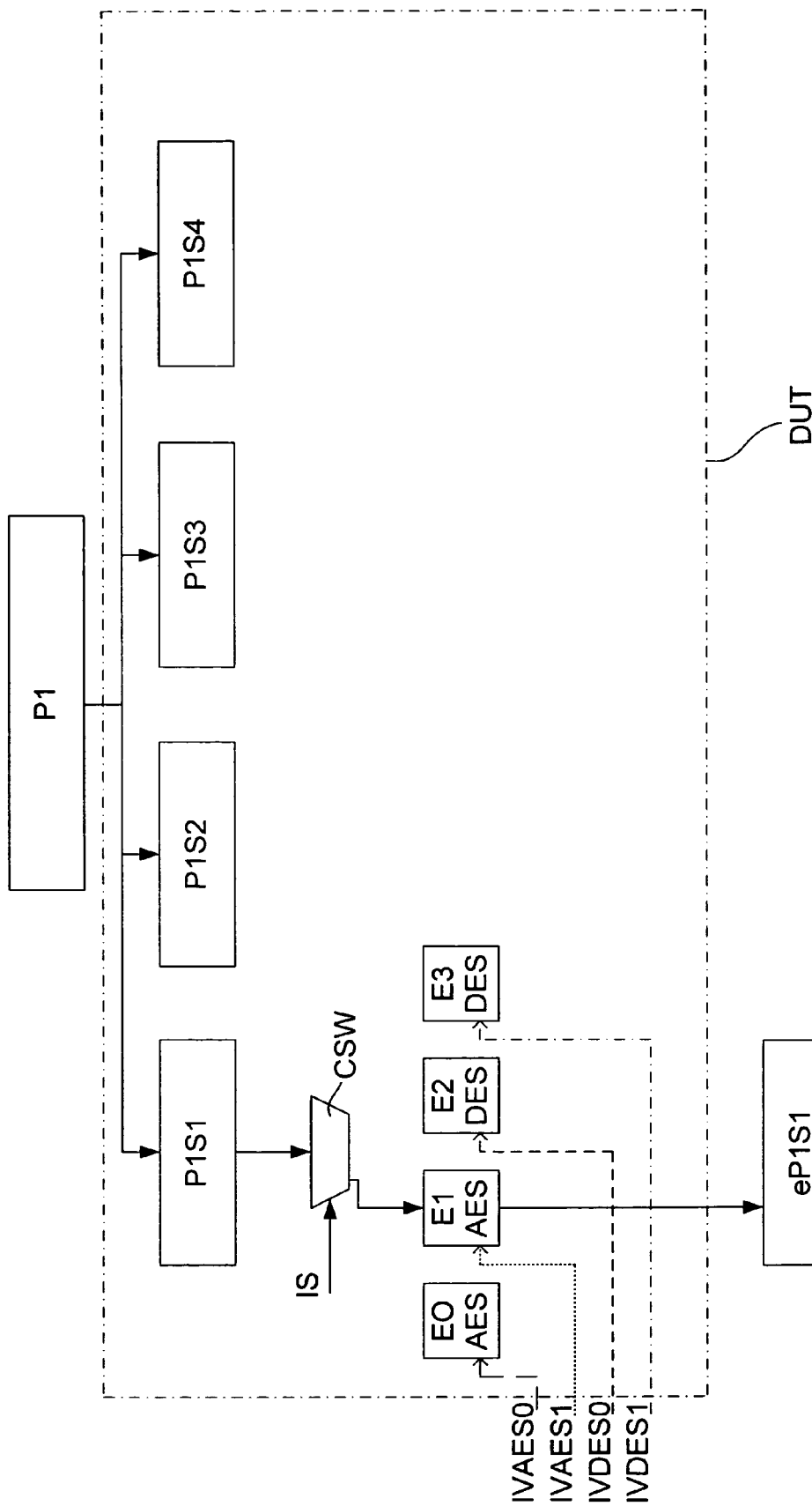
FIGS. 1-7 illustrate an encryption process wherein a device under test (DUT) uses cipher block chaining for encryption of a data string in accordance with the prior art.
Figure 2:
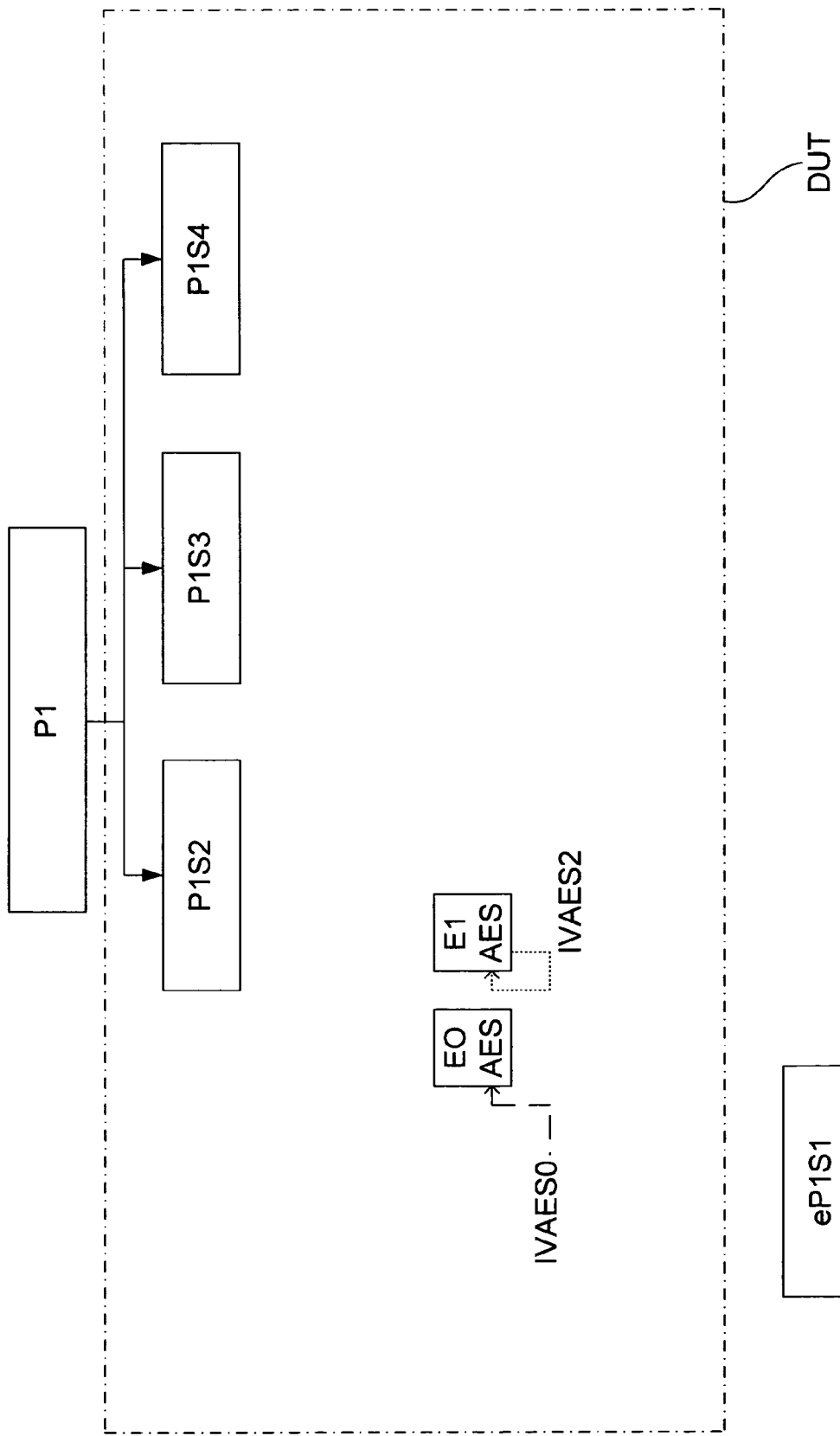
Figure 3:
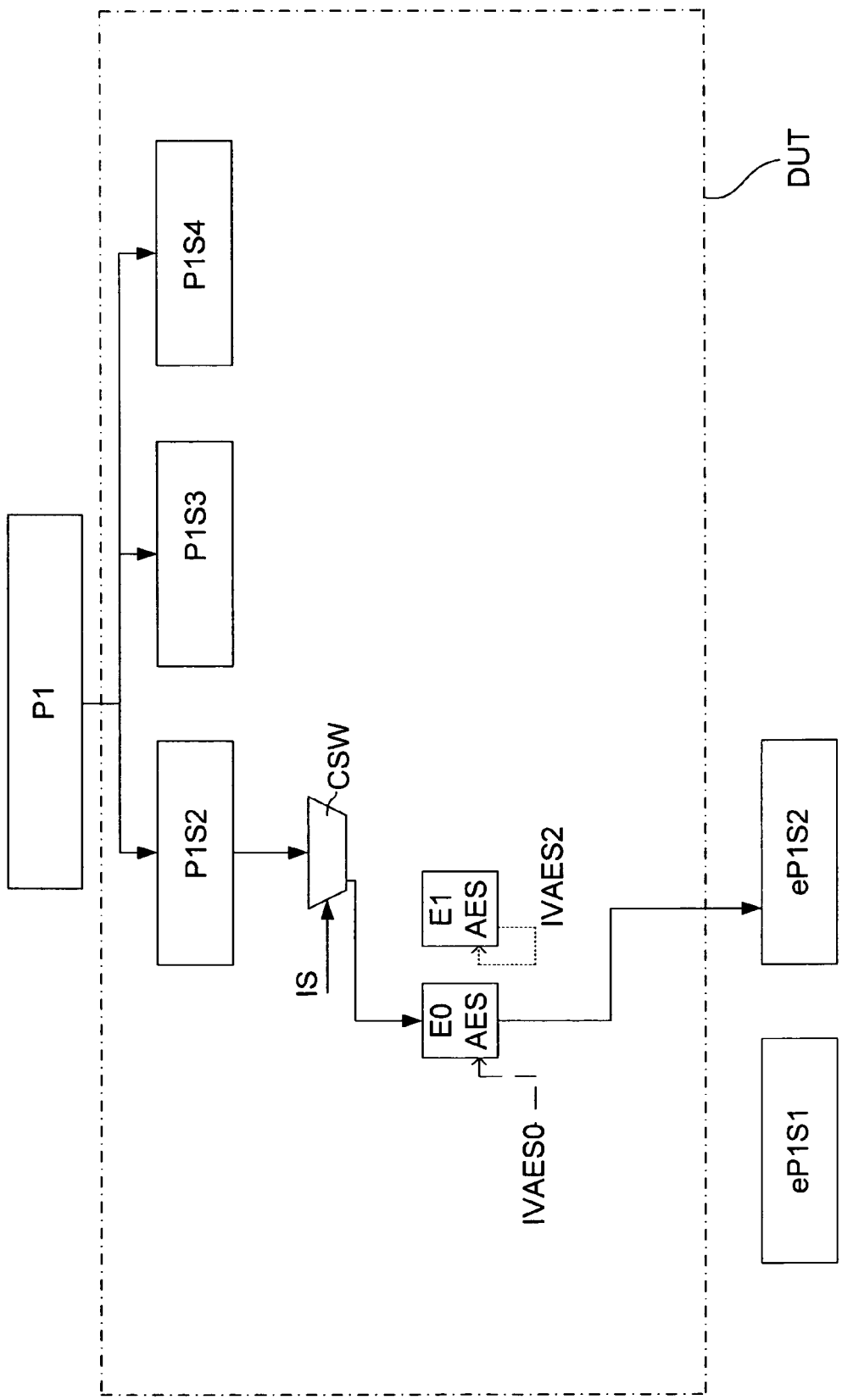
Figure 4:
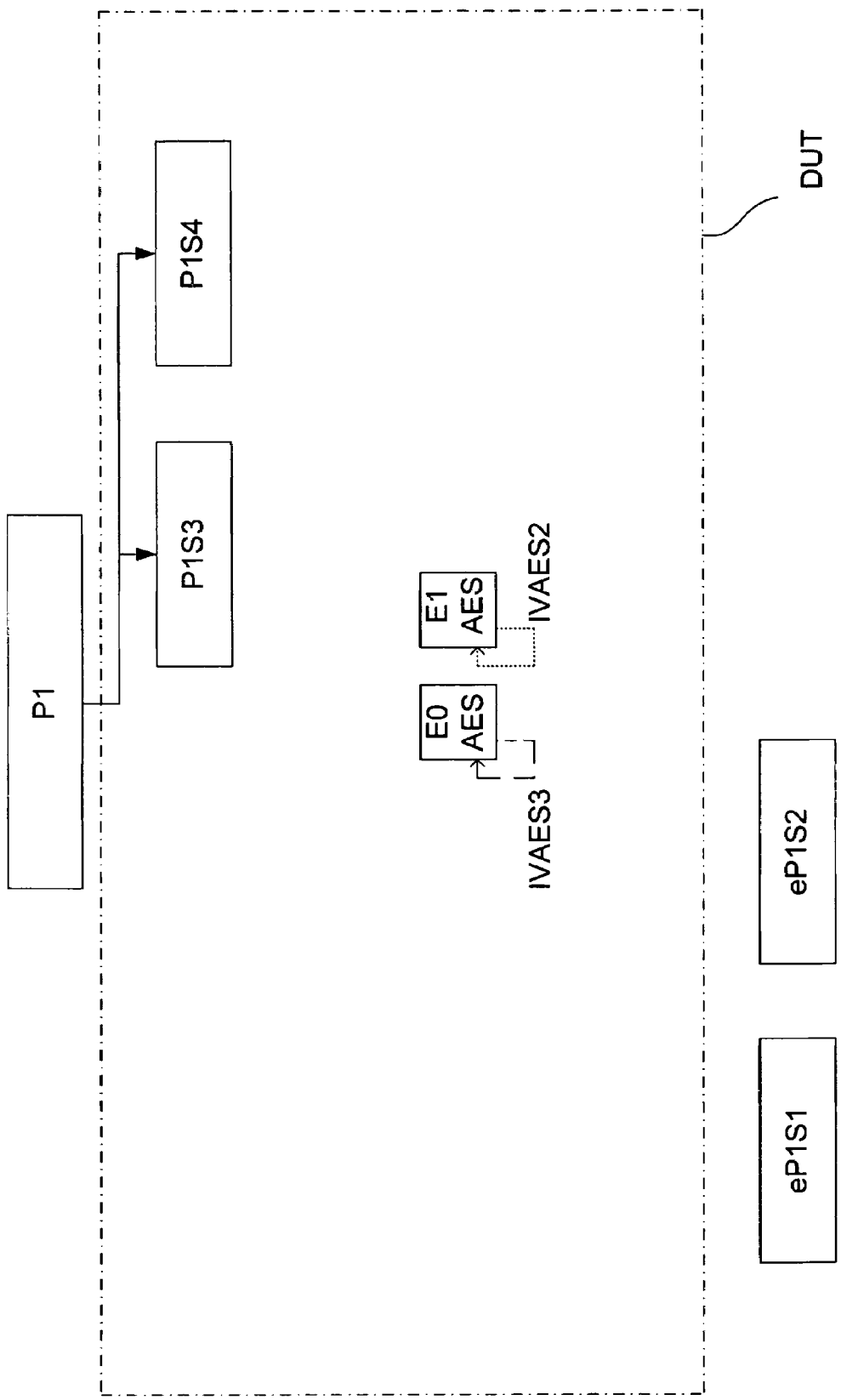
Figure 5:
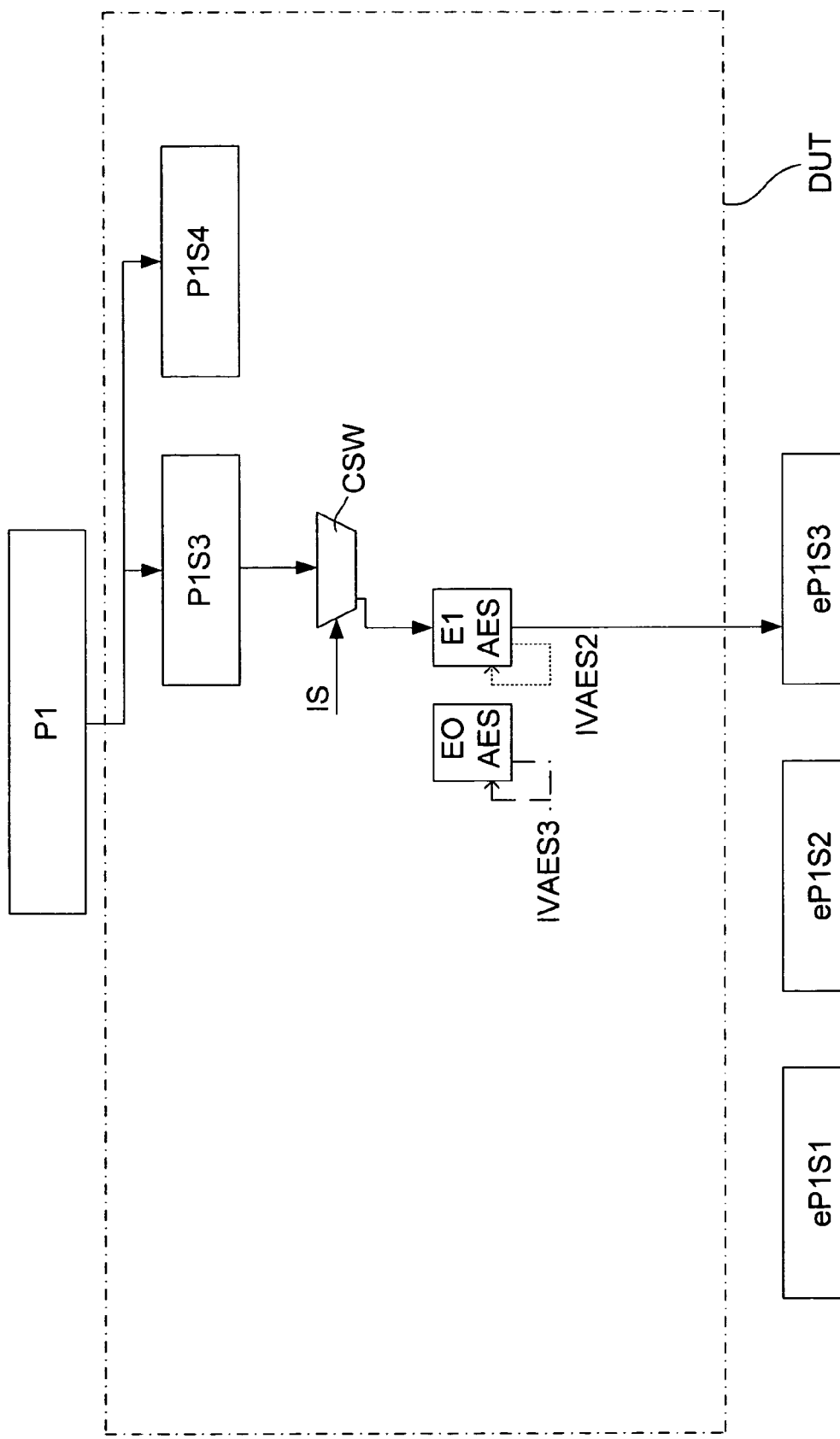
Figure 6:
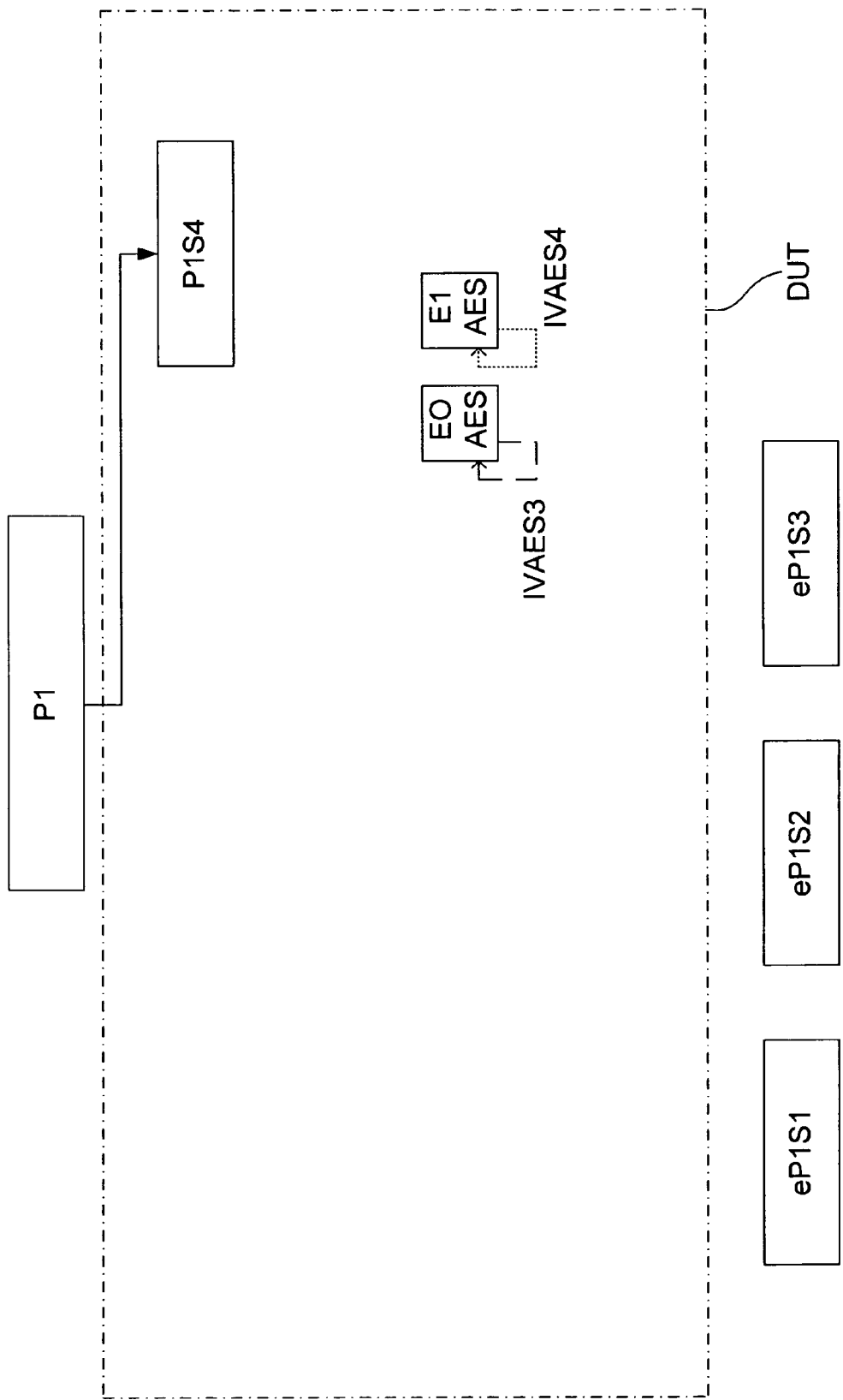
Figure 7:
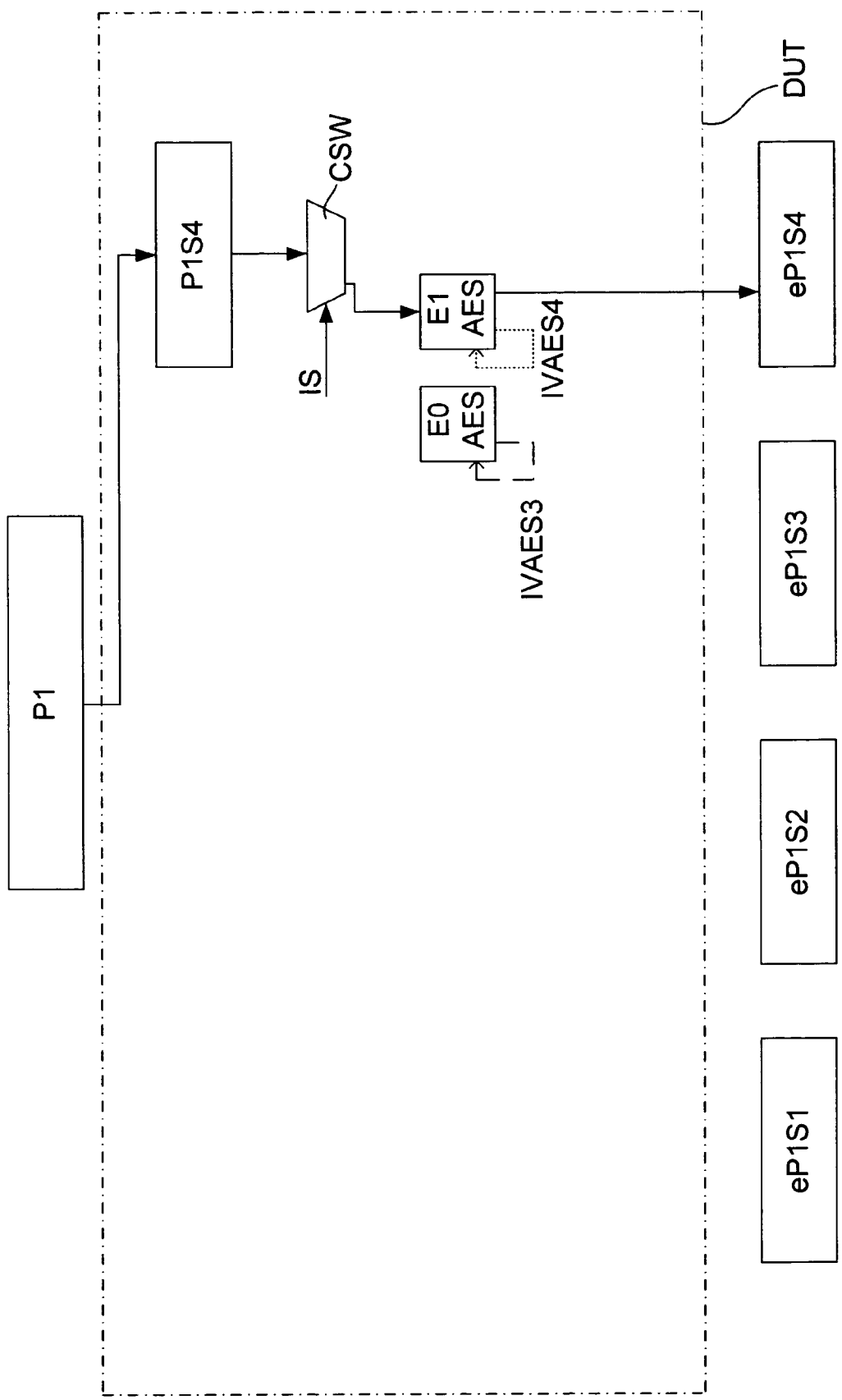
Figure 8:
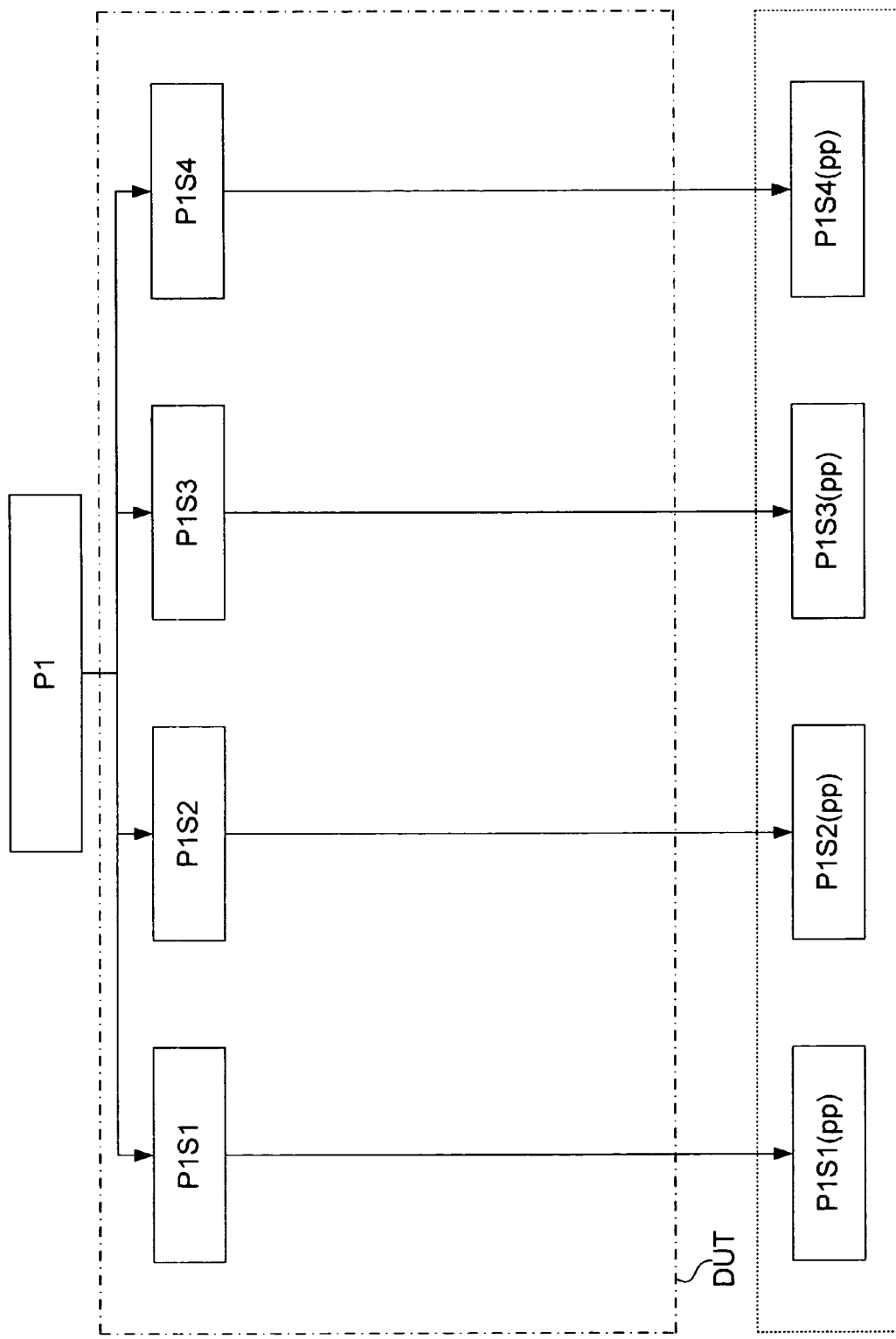
FIGS. 8-15 illustrate the encryption process wherein a device under test (DUT) uses cipher block chaining for encryption of a data string in accordance with the present invention.

As shown in FIG. 8, a packet data string P1 is applied to a device under test (DUT), and a preprocessing function is undertaken, wherein the segmentation function of the DUT is used to break down the packet into a series of packet segment data strings P1S1(pp), P1S2(pp), P1S3(pp) P1S4 (pp), based on the set or fixed (static) properties of the packet data string (i.e., packet properties, DUT settings, and Security Association (SA) properties). While the packet segment data string is associated with an SA property indicating and determining the encryption algorithm to be applied thereto, i.e., either AES or DES, no encryption function is undertaken in the preprocessing function. The plurality of unencrypted packet segment data strings are then placed in a queue in a memory structure MS.

Figure 9:
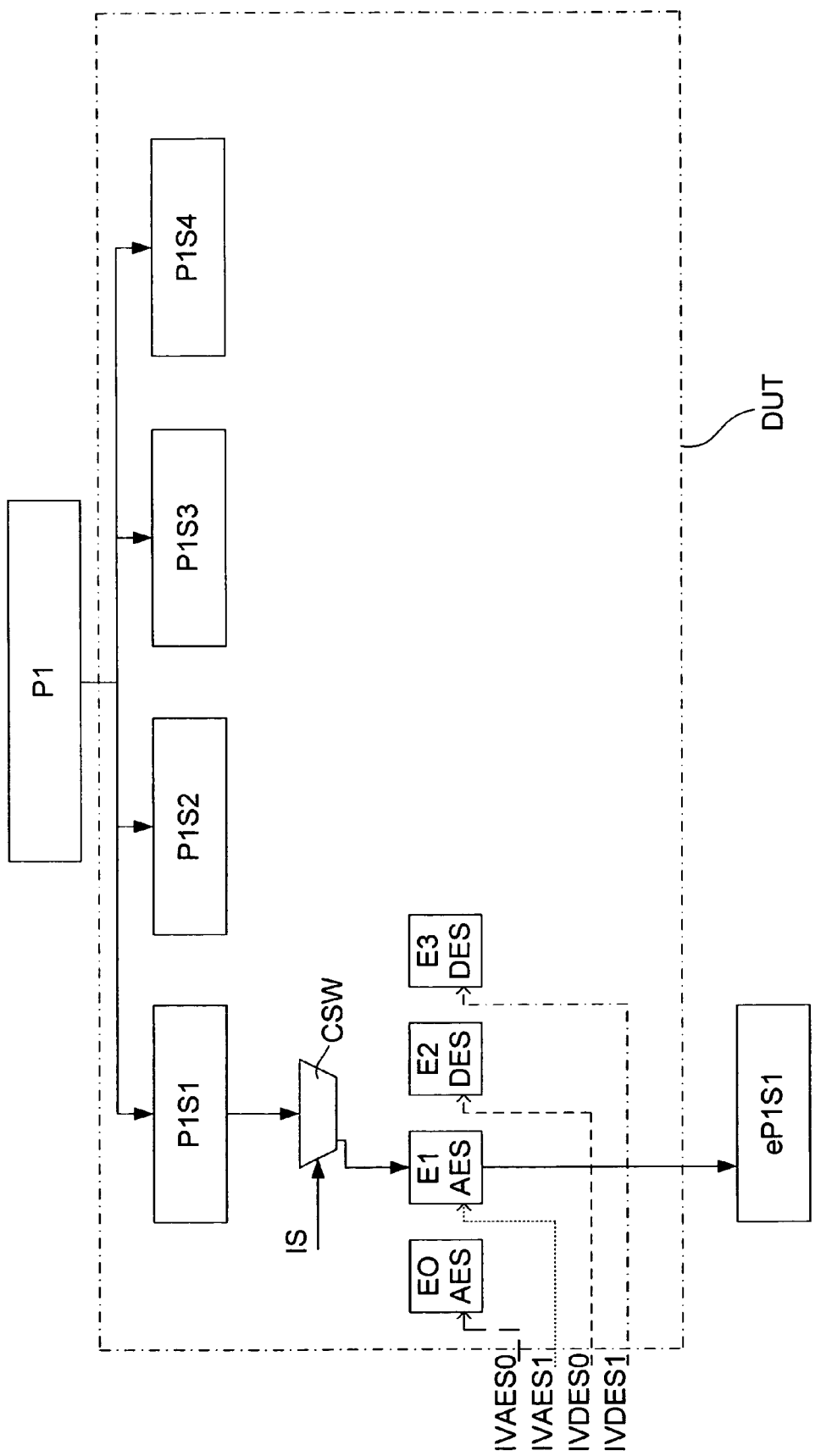

Similar to the above description, and with reference to FIG. 9, the DUT includes four encryption engines, noted at E0, E1, E2, E3. Each encryption engine includes an encryption algorithm, each encryption engine E0, E1 including the encryption algorithm AES, while each encryption engine E2, E3 includes the encryption algorithm DES. The original packet data string P1 is associated with the security association (SA) property which indicates and determines the algorithm to be applied thereto, which indication is passed on and associated with each segment data string P1S1, P1S2, P1S3, P1S4.

Initially, each encryption engine has applied thereto a chosen and known initialization vector or key, for example, encryption engine E0 has applied to thereto initialization vector IVAES0, encryption engine E1 has applied thereto initialization vector IVAES1, encryption engine E2 has applied thereto initialization vector IVDES0, and encryption engine E3 has applied thereto initialization vector IVDES1.

Separate from the preprocessing operation described above, and with regard to FIG. 9, the packet data string P1 is applied to a device under test (DUT), and the segmentation function thereof is used to break down the packet P1 into a series of packet segment data strings P1S1, P1S2, P1S3, P1S4, based on the set or fixed (static) properties of the packet data string described above. As noted above, the packet segment data strings can be applied to the DUT in any order. However, in this example, let us assume that the order is the same as in the Prior Art example illustrated and described above. One of the packet segment data strings P1S1 is applied to a cross-switch (CSW) of the DUT. As indicated above, this packet segment data string P1S1 is associated with SA property indicating the encryption algorithm to be applied to that data string. An input signal IS is applied to the CSW, which input signal is a function of the packet SA property indicating the encryption algorithm to be applied. For example, if that packet SA property indicates that algorithm AES is to be applied to the packet segment data string P1S1, the CSW will receive the data string and apply it to either encryption engine E0 or encryption engine E1, both of which include the encryption algorithm AES. The decision whether to select encryption engine E0 or encryption engine E1 is undertaken as described above, i.e., the decision depends on which such encryption engine is free for operation (if both encryption engines E0, E1 are free, the system is preset to select one of them—if both encryption engines E0, E1 are in use, the encryption engine which becomes free first is selected).

In accordance with the above, a packet segment data string P1S1 is applied to either encryption engine E0, which has initialization vector IVAES0 applied thereto, or to encryption engine E1, which has initialization vector IVAES1 applied thereto. A record is kept of the initialization vectors (in this case IVAES0, IVAES1), either of which can be expected to have been in involved in the encryption. Let us assume that the packet segment data string P1S1 is applied to encryption engine E1 (FIG. 9). An encrypted packet segment data string eP1S1, based on the encryption algorithm AES, issues from the DUT. Included with this encrypted packet segment data string eP1S1 is an initialization vector which should correspond to the initialization vector actually applied in the encryption, i.e., in this case IVAES1.

Let us assume that we wish to check the encryption function of the DUT in encrypting that particular packet segment data string P1S1. Initially, a packet segment data string is retrieved from the queue of the memory structure MS (FIG. 8), and the bit length thereof is compared with the bit length of the encrypted packet segment data string eP1S1. If a match of bit lengths is not found, another packet segment data string is retrieved from the queue of the memory structure MS, and the bit length comparison is repeated, and so forth, until a bit length match is found. If a bit length match is not found with any of the packet segment data strings in the queue, it is confirmed that the DUT encryption operation is erroneous.

Once a bit length match is found between the encrypted packet segment data string eP1S1 and a packet segment data string in the queue, the initialization vector with the encrypted packet segment data string eP1S1 is extracted therefrom and is compared to the possible initialization vectors which could have been applied in the encryption, i.e., initialization vector IVAES0 and IVAES1, either of which could be expected to have been applied in accordance with the records kept as noted above. If no match is found between the initialization vector with the encrypted packet segment data string eP1S1 and either initialization vector IVAES0 or initialization vector IVAES1, it is understood that the DUT encryption operation is erroneous. If a match is found between the initialization vector with the encrypted packet segment data string and either initialization vector IVAES0 or initialization vector IVAES1, the initialization vector extracted from the encrypted packet segment data string is applied with the encryption algorithm AES to the matching-length packet segment data string retrieved from the memory structure MS to encrypt the preprocessed packet segment data string to provide an encrypted version thereof. This encrypted packet segment data string based on the preprocessed packet segment data string is compared bitwise with the initially issued encrypted packet segment data string eP1S1. If a bitwise match is found, it is understood that the operation of the encryption function of the DUT in encrypting the packet segment data string P1S1 has been confirmed. If a bitwise match is not found, the length-matching process is repeated, using the encrypted packet segment data string eP1S1 initially issued from the DUT and another packet segment data string retrieved from the queue. If a bitwise match is not found after going through this process for all the packet segment data strings in the memory structure MS, it is confirmed that the DUT encryption operation is erroneous.

The following example will illustrate the minimal number of steps involved in the above procedure. Let us assume in the above example the worst-case scenario that the bit length of the encrypted packet segment data string eP1S1 matches each of the bit lengths of the packet segment data strings P1S1($pp$), P1S2($pp$), P1S3($pp$), P1S4($pp$) in the queue, i.e., none of the packet segment data strings in the queue can be eliminated on the basis of non-matching bit lengths. Let us assume that after finding initialization vector matching and after encrypting that first-accessed packet segment data string P1S1 in accordance with the above, a bitwise match is not found. At this point, one does not know whether the failure to find a bitwise match is due to an encryption error or is due simply to the fact that the packet segment data string from the queue does not correspond to the packet segment data string P1S1 which was encrypted. Then, let us assume that after another (second-accessed) packet segment data string is accessed from the queue, and after encryption thereof in accordance with the above, a bitwise match is again not found. Again, one does not know whether the failure to find a bitwise match is due to an encryption error or due simply to the fact that the packet segment data string from the queue does not correspond to the packet segment data string P1S1 which was encrypted. Next, let us assume that after another (third-accessed) packet segment data string is accessed from the queue, and after encryption thereof in accordance with the above, a bitwise match is again not found. Again, it is not known whether the failure to find a bitwise match is due to an encryption error or due simply to the fact that the packet segment data string from the queue does not correspond to the packet segment data string P1S1 which was encrypted. When the next (last, fourth-accessed) packet segment data string is accessed from the queue and is encrypted in accordance with the above, it will be determined whether the encryption function of the DUT has been confirmed or is erroneous.

It will readily be seen that after confirmation of initialization vector matching as set forth above, this is the maximum number of steps (four) necessary to confirm the encryption function of the DUT in regard to the encrypted packet segment data string eP1S1 issuing from the DUT.

Next, assuming that the encryption function of the DUT has in this last step been confirmed, the packet segment data string in the queue which was used in such confirmation is removed from the queue, leaving three packet segment data strings in the queue.

Figure 10:
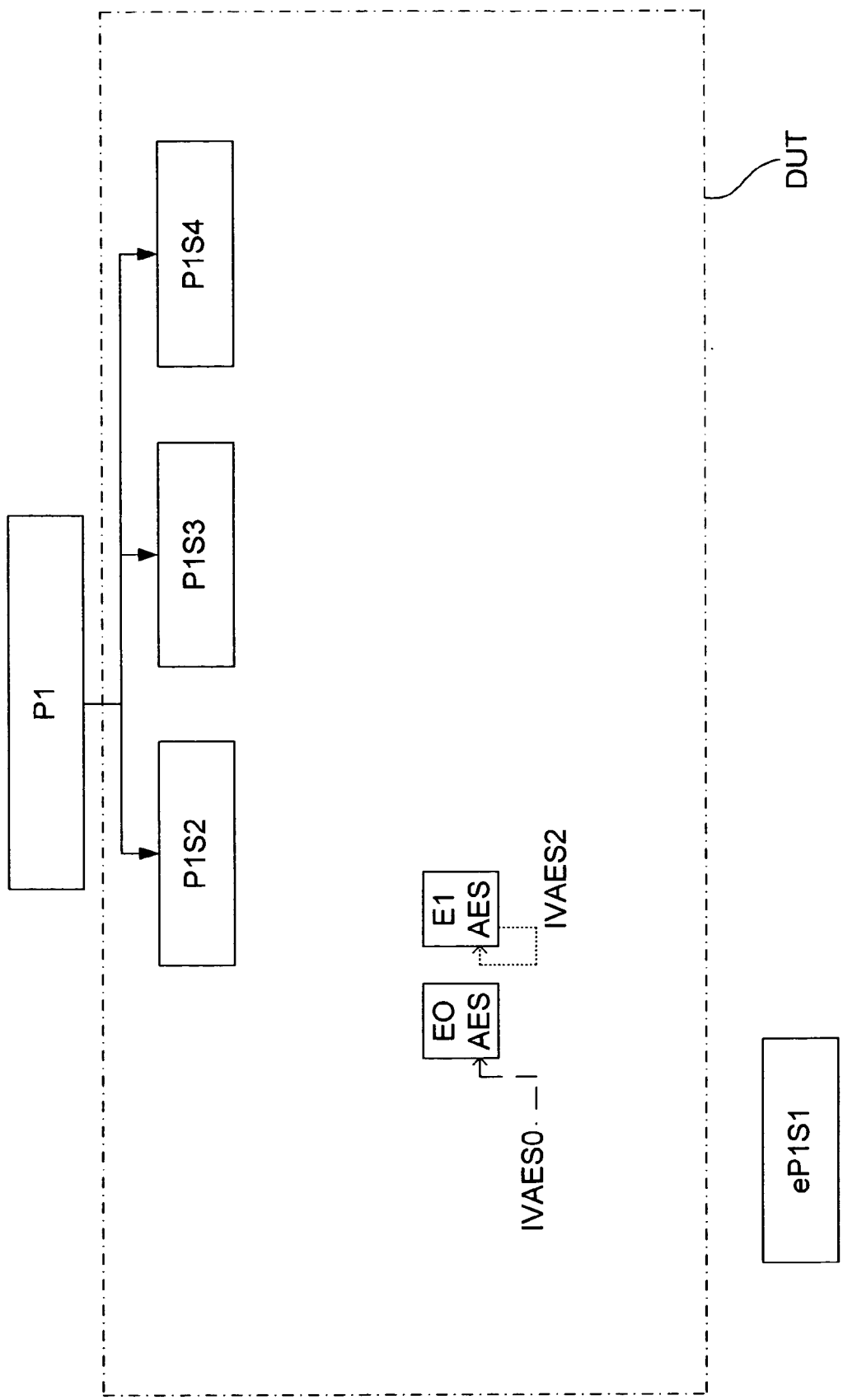
Figure 11:
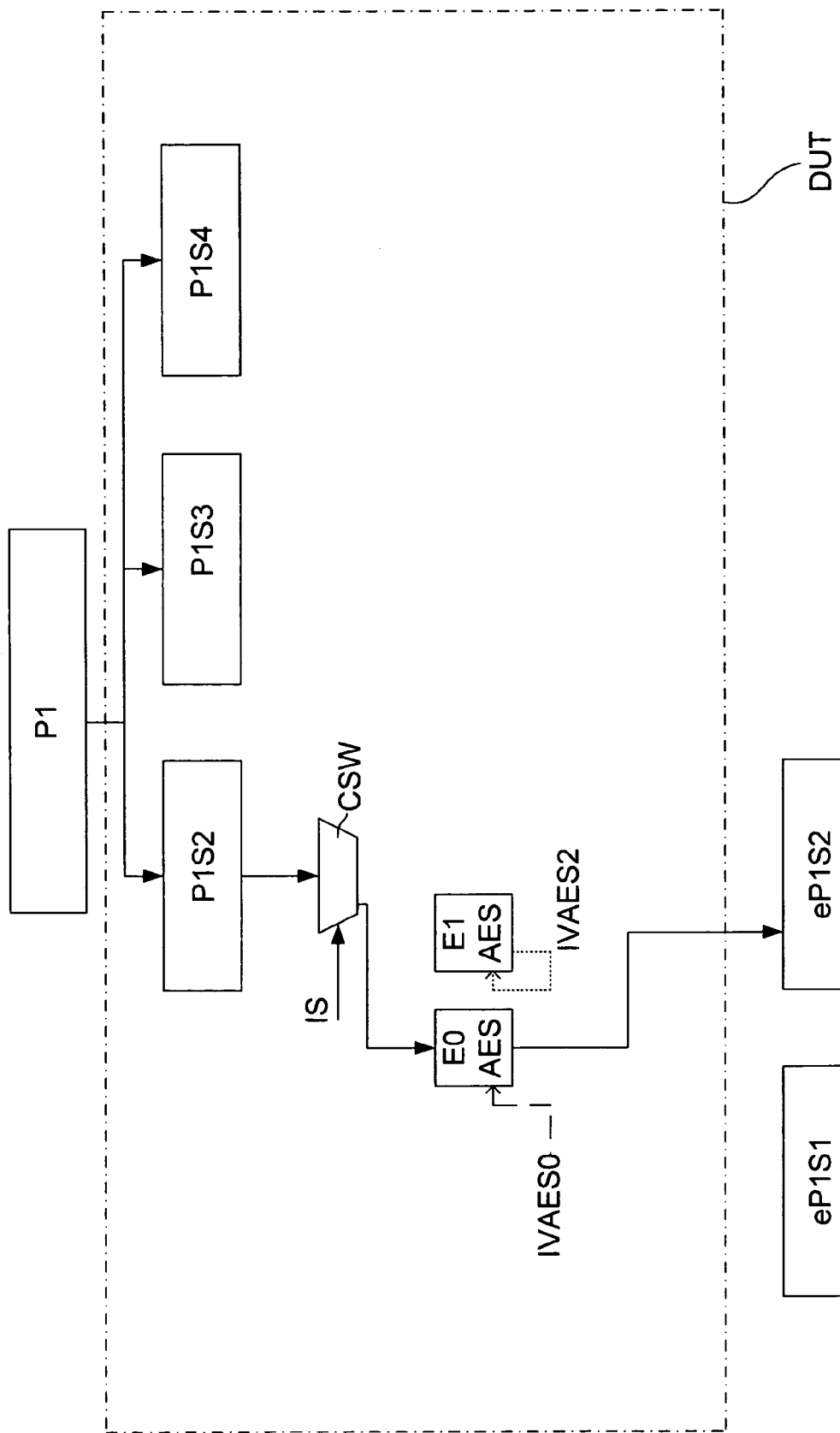

Then, with reference to FIGS. 10 and 11, another packet segment data string P1S2 is applied to a cross-switch (CSW) of the DUT. As indicated above, this packet segment data string P1S2 is associated with SA property indicating the encryption algorithm to be applied to that data string. An input signal IS is applied to the CSW, which input signal is a function of the packet SA property indicating the encryption algorithm to be applied. For example, if that packet SA property indicates that algorithm AES is to be applied to the packet segment data string P1S2, the CSW will receive the data string and apply it to either encryption engine E0 or encryption engine E1, both of which include the encryption algorithm AES. The decision whether to select encryption engine E0 or encryption engine E1 is undertaken as described above, i.e., the decision depends on which such encryption engine is free for operation (if both encryption engines E0, E1 are free, the system is preset to select one of them—if both encryption engines E0, E1 are in use, the encryption engine which becomes free first is selected).

In accordance with the above, packet segment data string P1S2 is applied to either encryption engine E0 or encryption engine E1. As set forth above, one of the initialization vectors has been changed (with encryption engine E1 used in the previous encryption, the initialization vector IVAES1, previously applied to encryption engine E1, has been changed to initialization vector IVAES2). The record of the initialization vectors is updated, so that the record now indicates initialization vectors IVAES0, IVAES2 (FIG. 10) either of which could be expected to have been involved in the encryption of packet segment data string P1S2. Let us assume that the packet segment data string P1S2 is applied to encryption engine E0. An encrypted packet segment data string eP1S2, based on the encryption algorithm AES, issues from the DUT (FIG. 11). Included with this encrypted packet segment data string eP1S2 is an initialization vector which should correspond to the initialization vector actually applied in the encryption, i.e., in this case IVAES0.

The length-matching and initialization vector matching steps are undertaken as set forth above, but now only with three packet segment data strings in the queue. Thus, after initialization vector matching as described above, now based on the updated record of the initialization vectors, the maximum number of further steps necessary to confirm the encryption function of the DUT in regard to this encrypted packet segment data string eP1S3 is three.

Next, assuming that the encryption function of the DUT has in this last step been confirmed, the packet segment data string in the queue which was used in such confirmation is removed from the queue, leaving two packet segment data strings in the queue.

Figure 12:
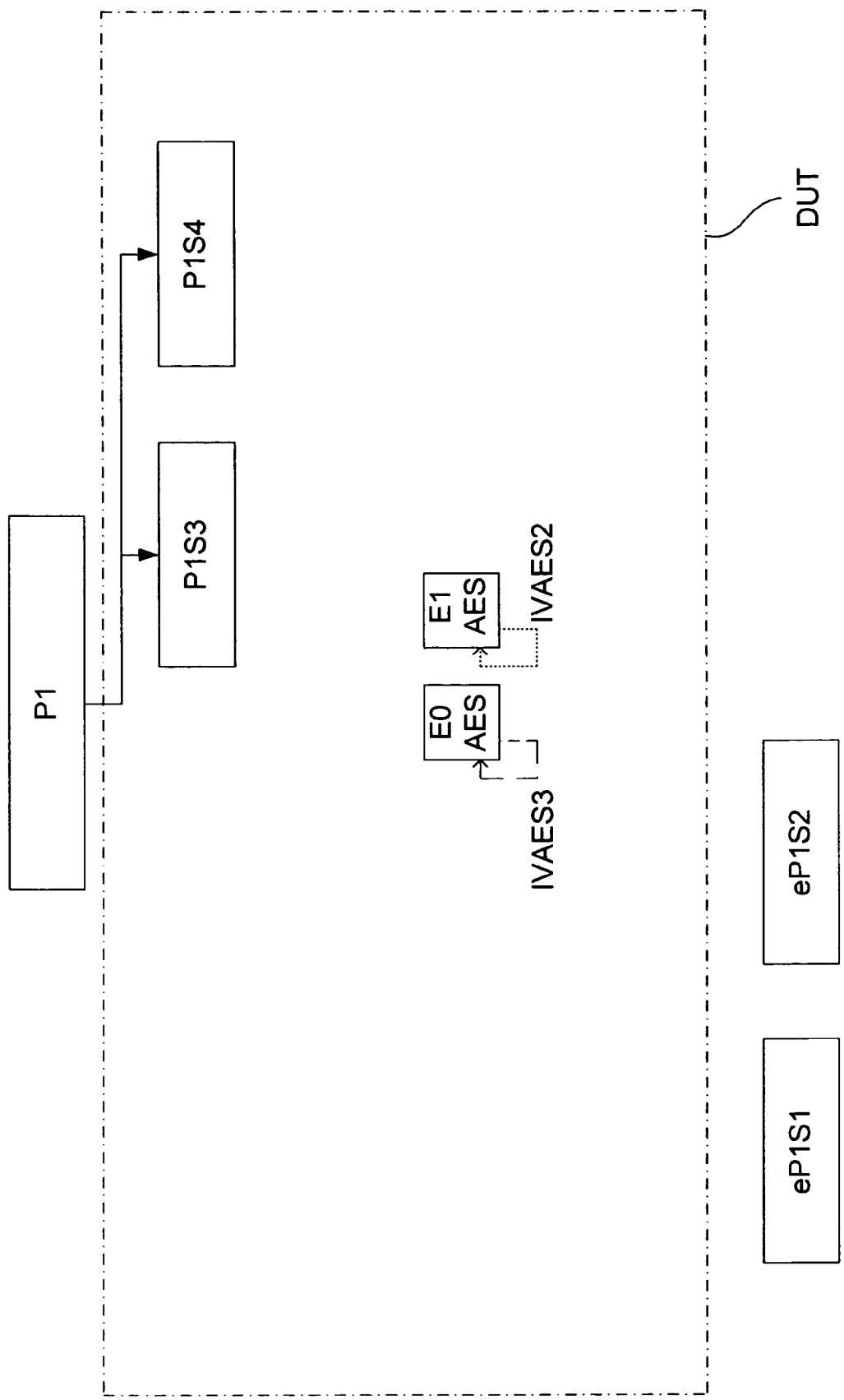
Figure 13:
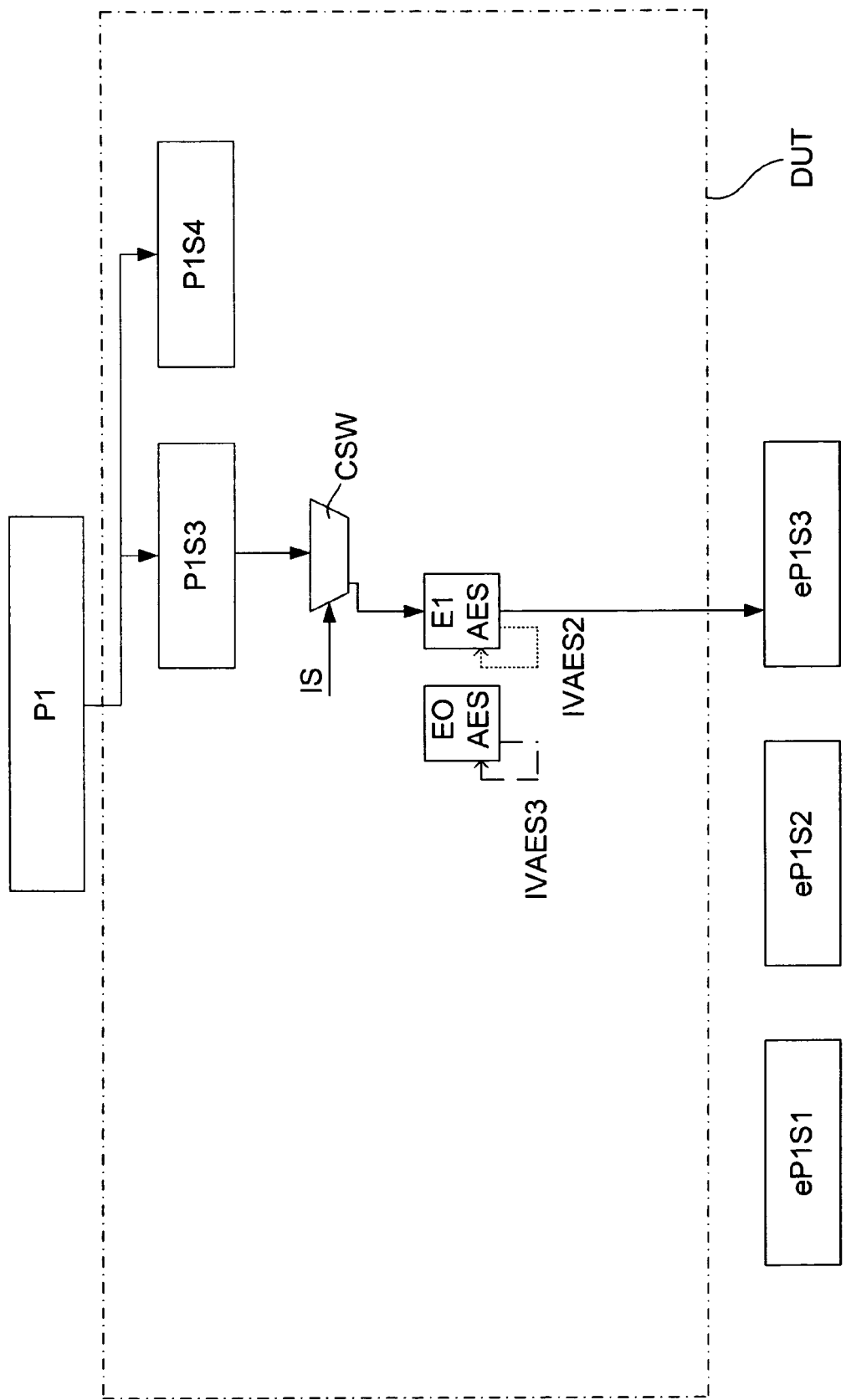

Then, with reference to FIGS. 12 and 13, another packet segment data string P1S3 is applied to either encryption engine E0 or E1. In accordance with the above description, one of the initialization vectors has been changed (with encryption engine E0 used in the previous encryption of packet segment data stream P1S2, the initialization vector IVAES0, previously applied to encryption engine E0, has been changed to initialization vector IVAES3). The record of the initialization vectors is updated, so that the record now indicates initialization vectors IVAES3, IVAES2 (FIG. 12), either of which could be expected to have been involved in the encryption of the packet segment data string P1S3. Let us assume that the package segment data string P1S3 is applied to the encryption engine E1 (FIG. 13). An encrypted packet segment data string eP1S3, based on the encryption algorithm AES, issues from the DUT. Included with this encrypted packet segment data string eP1S3 is an initialization vector which should correspond to the initialization vector actually applied in the encryption, i.e., IVAES2.

The length-matching and initialization vector matching steps are undertaken as set forth above, but now only with two packet segment data strings in the queue. Thus, after initialization vector matching as described above, now based on the updated record of the initialization vectors, the maximum number of further steps necessary to confirm the encryption function of the DUT in regard to this encrypted packet segment data string eP1S3 is two.

Next assuming that the encryption function of the DUT has in this last step been confirmed, the packet segment data string in the queue which was used in such confirmation is removed from the queue, leaving one packet segment data string in the queue.

Figure 14:
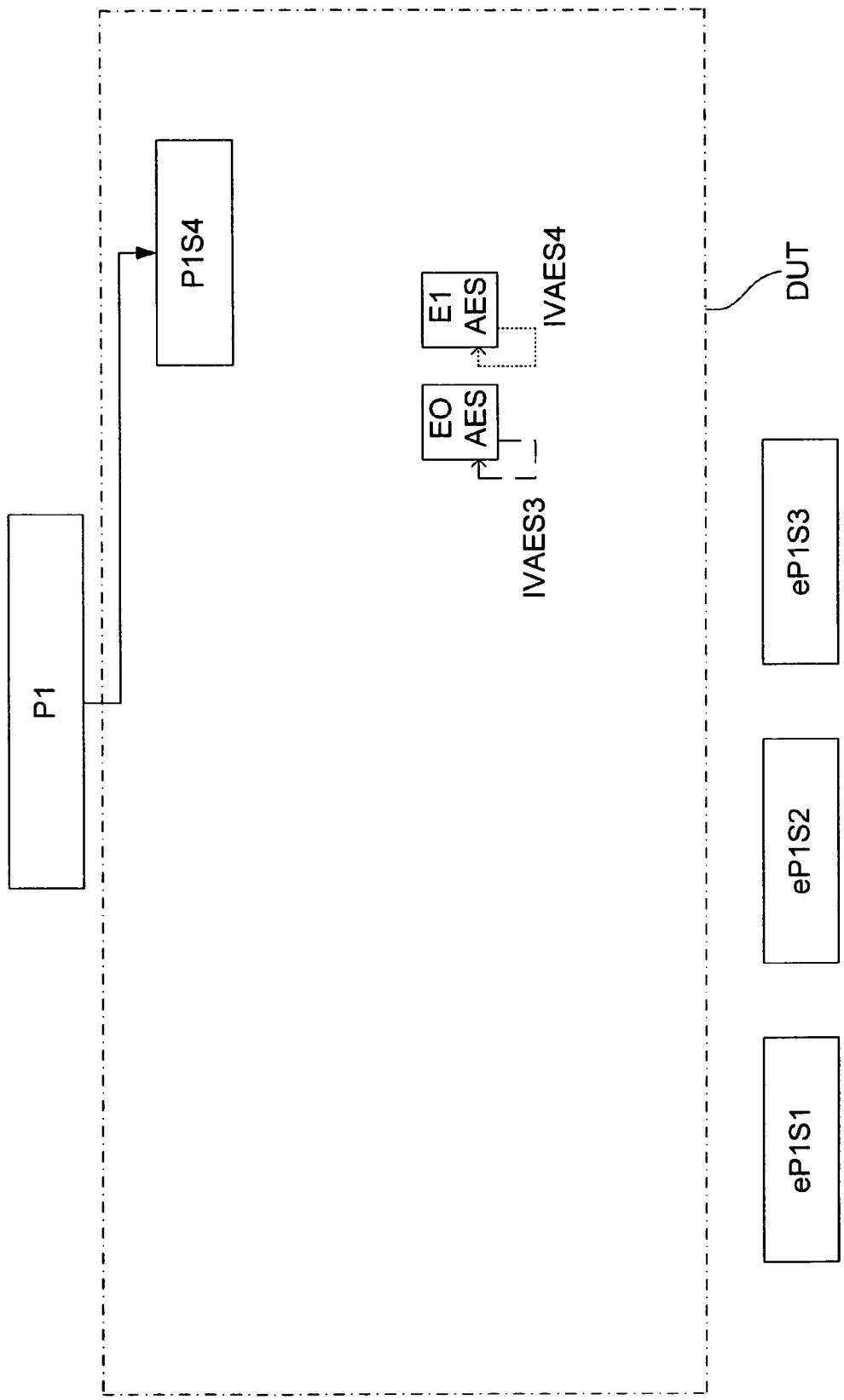
Figure 15:
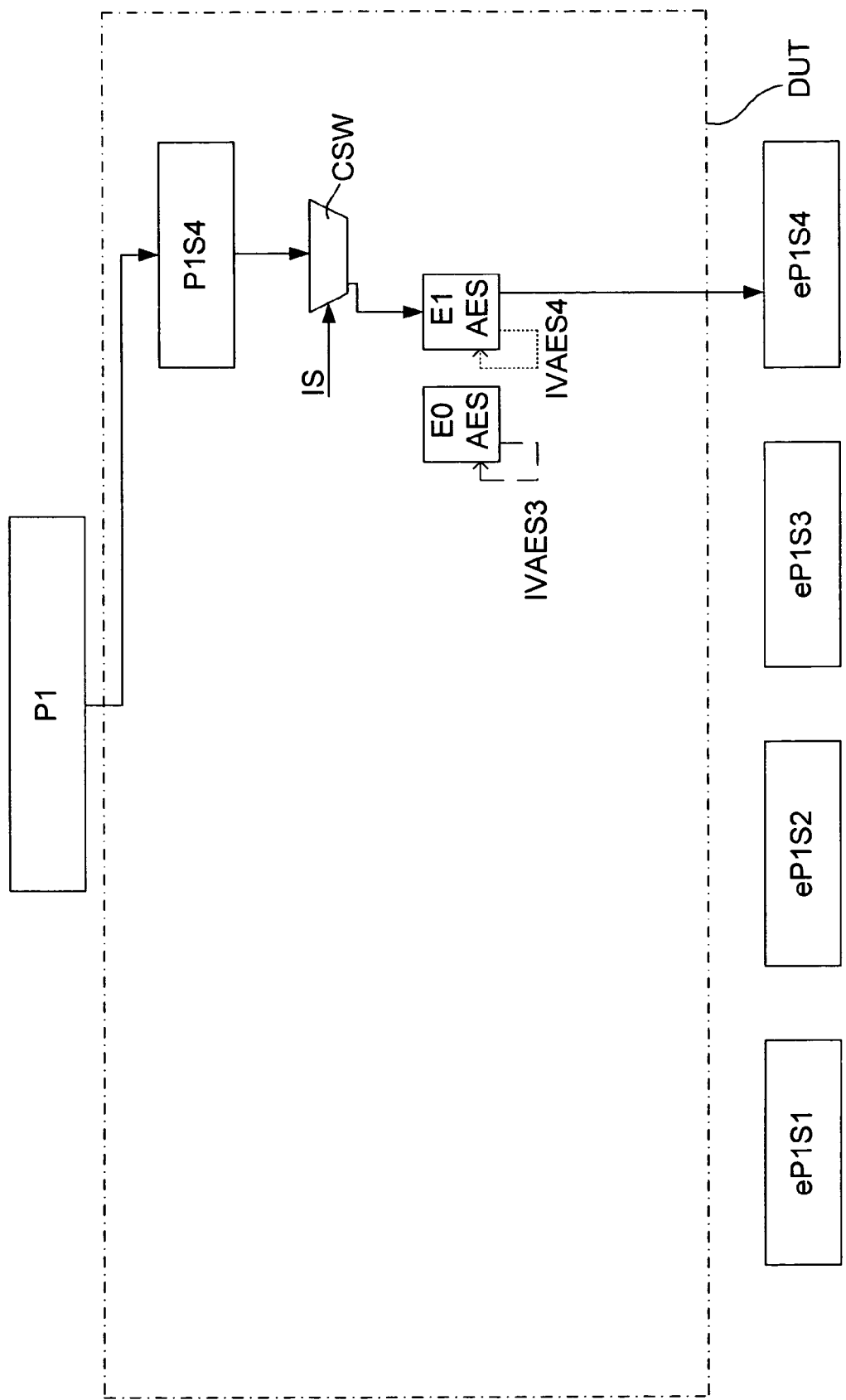
Figure 16A:
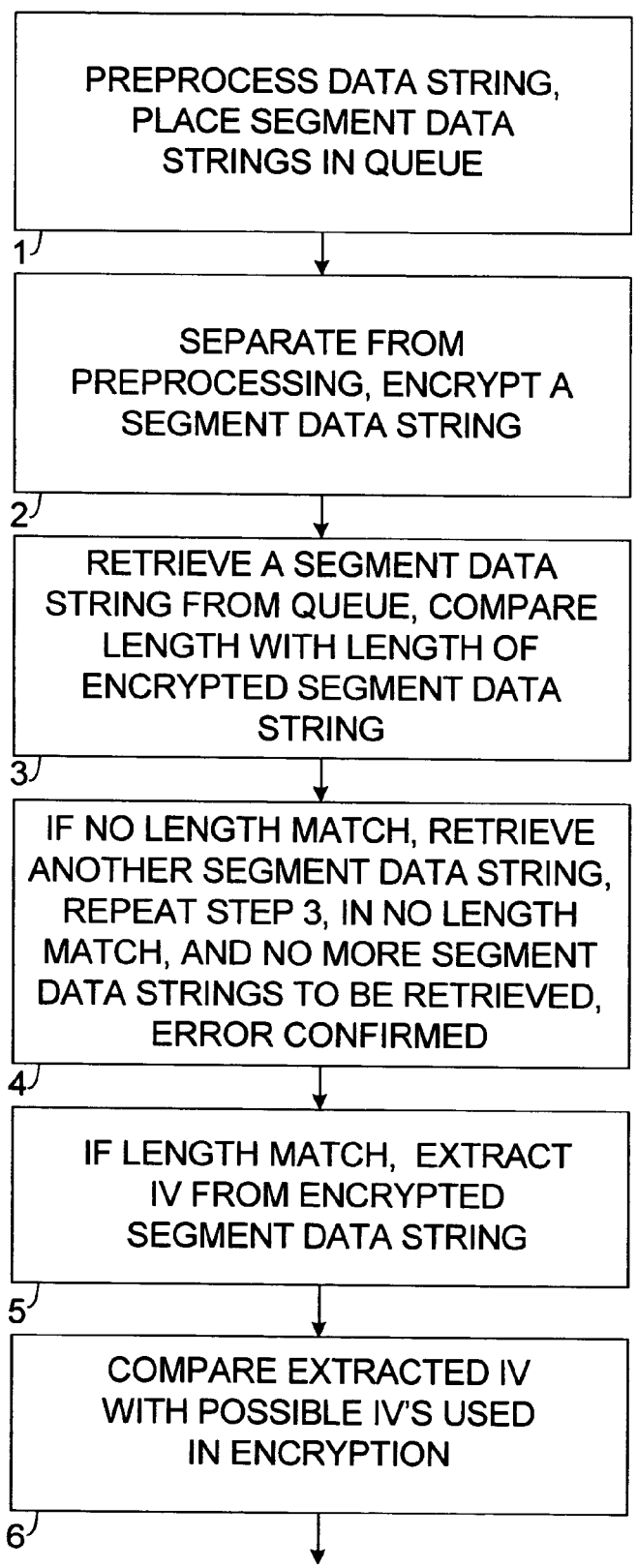
FIG. 16 includes FIGS. 16A and 16B and illustrates the flow of method steps of the present invention.
Figure 16B:
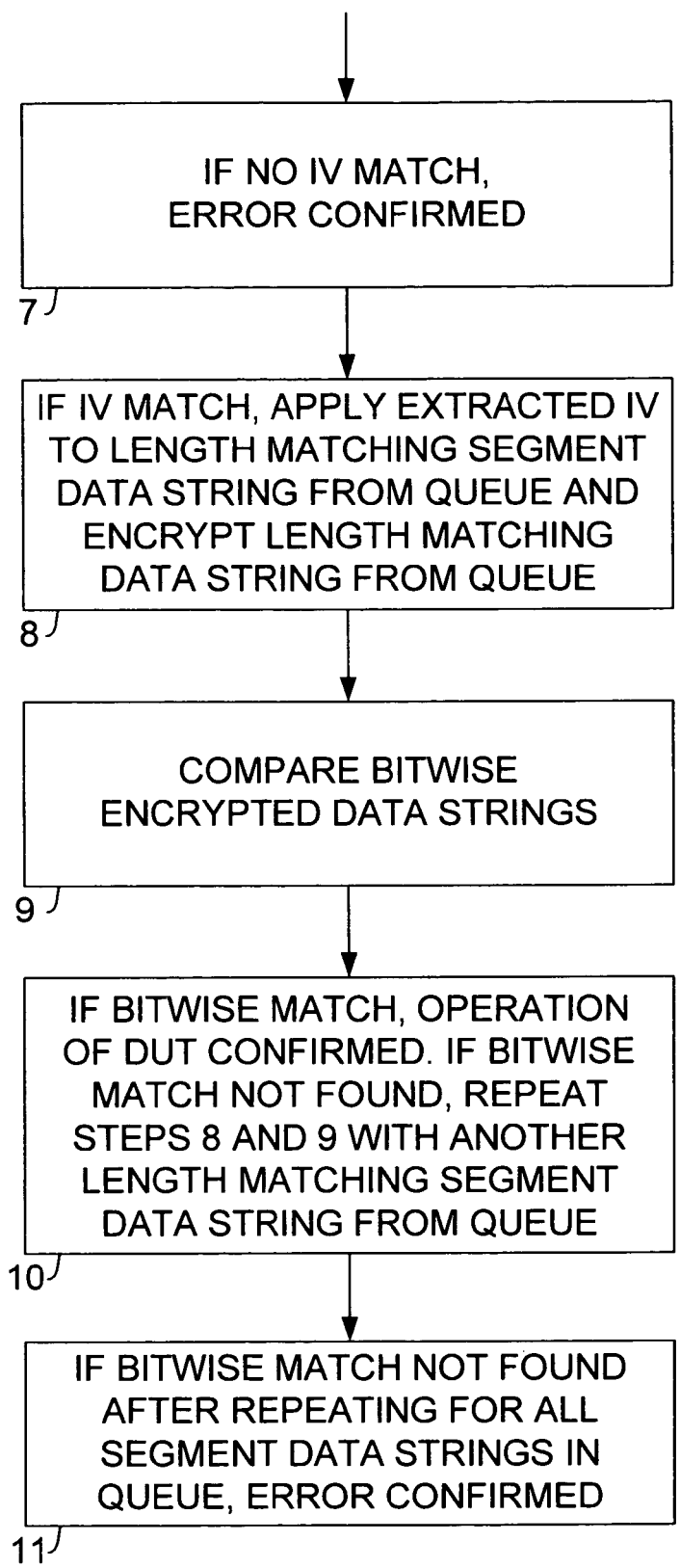

Then, with reference to FIGS. 14 and 15, the last packet segment data string P1S4 is applied to either encryption engine E0 or E1. In accordance with the above description, one of the initialization vectors has been changed (as encryption engine E1 was used in the previous encryption of packet segment data string P1S3, the initialization vector IVAES2, previously applied to encryption engine E1, has been changed to initialization vector IVAES4). The record of the initialization vectors is updated, so that the record now indicates initialization vectors IVAES3, IVAES4 (FIG. 14), either of which could be expected to have been involved in the encryption of the packet segment data string P1S4. Let us assume that the packet segment data string P1S4 has been applied to the encryption engine E1. An encrypted packet segment data string eP1S4, based on the encryption algorithm AES, issues from the DUT. Included with this encrypted packet segment data string is an initialization vector which should correspond to the initialization vector actually applied any encryption, i.e., IVAES4.

The length-matching and initialization vector matching steps are undertaken as set forth above, but now only with one packet segment data string in the queue. Thus, after initialization vector matching as described above, now based on the updated record of the initialization vectors, the maximum number of further steps necessary to confirm the encryption function of the DUT in regard to this encrypted packet segment data string eP1S4 is one.

It will be noted that with the present approach, the maximum number of checks necessary for packet data string P1, which is segmented into four packet segment data strings P1S1, P1S2, P1S3, P1S4, is 4+3+2+1=10, as compared to the 384 possibilities described above.

It will be seen that a practical method for testing the encryption function of a device under test has been achieved. In the present process, bitwise comparison is not undertaken until a very large number of packet segment data string have eliminated from consideration (i.e., no length match and/or no initialization vector match). Only when both these matches are realized is the encryption function applied to a packet segment data string in furtherance of bitwise comparison. Thus, a practical method for testing the encryption function of a device is achieved.

The foregoing description of the embodiment of the invention has been presented for purposes of illustration and description. It is not intended to be exhaustive or to limit the invention to the precise form disclosed. Other modifications or variations are possible in light of the above teachings.

The embodiment was chosen and described to provide the best illustration of the principles of the invention and its practical application to thereby enable one of ordinary skill of the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method of testing a device comprising:
providing a first data string;
providing a second data string in a memory structure;
encrypting the first data string using an encryption algorithm, to provide an encrypted data string; and
comparing a characteristic of the encrypted data string with a characteristic of the second data string, wherein the step of comparing a characteristic of the encrypted data string with a characteristic of the second data string comprises comparing the bit length of the encrypted data string with the bit length of the second data string, further comprising, if a match is found between the bit length of the encrypted data string and the bit length of the second data string in the memory structure, comparing an initialization vector associated the encrypted data string with an initialization vector applied in encrypting the first data string, further comprising, if a match is found between the initialization vector associated with the encrypted data string and the initialization vector applied in encrypting the first data string: extracting the initialization vector associated with the encrypted data string; applying the encryption algorithm to the second data string, using the extracted initialization vector, to provide an additional encrypted data string; comparing contents of the additional encrypted data string with contents of the previously generated encrypted data string.

2. The method of claim 1 wherein the data string in the memory structure is an unencrypted data string.

3. A method of testing a device comprising:
providing a first data string;
providing a plurality of data strings in a memory structure;

encrypting the first data string using an encryption algorithm, with an initialization vector applied in such encryption, to generate an encrypted data string; and comparing the initialization vector associated with the encrypted data string with the initialization vector applied in encrypting the first data string, wherein the step of comparing a characteristic of the encrypted data string with a characteristic of a data string in the memory structure comprises comparing the bit length of the encrypted data string with the bit length of a data string in the memory structure, further comprising, if a match is found between the bit length of the encrypted data string and the bit length of a data string in the memory structure, comparing an initialization vector associated with the encrypted data string with the initialization vector applied to the encryption engine, further comprising, if a match is found between the initialization vector in the encrypted data string and the initialization vector applied in the encryption of the first data string; extracting the initialization vector associated with the encrypted data string; applying the encryption algorithm to the matching length data string from the memory structure to provide an additional encrypted data string; and comparing contents of the additional encrypted data string with contents of the previously provided encrypted data string.

4. The method of claim 3 and further comprising, if a match is not found between the bit length of the encrypted data string and the bit length of a data string in the memory structure, comparing the bit length of the encrypted data string with the bit length of another data string in the memory structure.

5. The method of claim 3 wherein the data strings in the memory structure are unencrypted data strings.

* * * * *